United States Patent [19]

Kurafuzi et al.

[11] Patent Number: 4,597,024
[45] Date of Patent: Jun. 24, 1986

[54] TAPE RECORDER HAVING SOFT-TOUCH CONTROL OF AN ERASE HEAD

[75] Inventors: Takamasa Kurafuzi, Yokohama; Shigeharu Kitagawa, Fujisawa; Shigeo Yamada, Tokyo, all of Japan

[73] Assignee: Tokyo Shibaura Denki Kabushiki Kaisha, Kawasaki, Japan

[21] Appl. No.: 498,781

[22] Filed: May 27, 1983

[30] Foreign Application Priority Data

Jun. 4, 1982 [JP] Japan .................. 57-96029

[51] Int. Cl.⁴ .......................... G11B 15/04; G11B 5/54
[52] U.S. Cl. .................................. 360/105; 360/96.1; 360/118
[58] Field of Search .................. 360/60, 137, 104–105, 360/118, 90, 93, 96.1–96.4

[56] References Cited

U.S. PATENT DOCUMENTS

| 4,021,856 | 5/1977 | Motoyama et al. | 360/93 |
| 4,050,088 | 9/1977 | Okuda | 360/90 |
| 4,106,064 | 8/1978 | Hoshido | 360/60 |
| 4,194,229 | 3/1980 | Yamamota et al. | 360/137 |
| 4,287,542 | 9/1981 | Okuda | 360/90 |

FOREIGN PATENT DOCUMENTS 2233811 1/1973 Fed. Rep. of Germany ........ 360/60

Primary Examiner—John H. Wolff
Assistant Examiner—David J. Severin
Attorney, Agent, or Firm—Cushman, Darby & Cushman

[57] ABSTRACT

A tape recorder using a magnetic erase head wherein the erase head is brought into contact with a tape in the record mode and is separated therefrom in the play mode. A record operating member determines whether or not the erase head is brought into contact with the tape. The movement of the erase head is controlled by the rotational force of the motor, thereby improving "soft-" or "feather-touch" operation.

9 Claims, 13 Drawing Figures

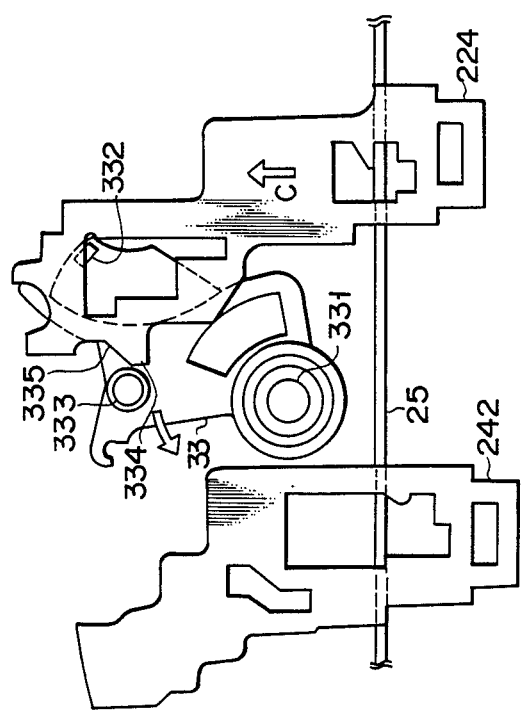
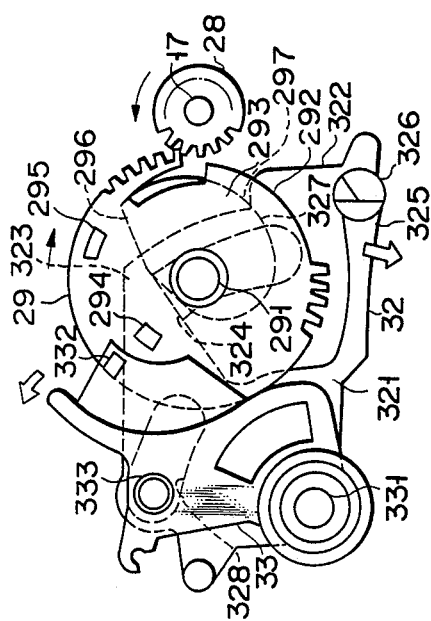
FIG. 4
FIG. 3

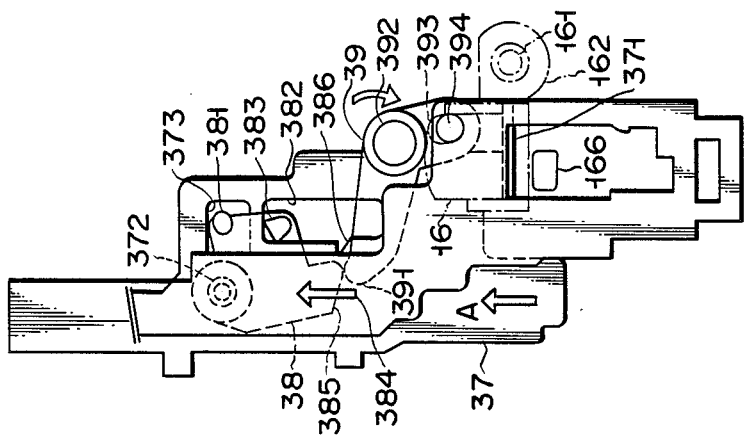
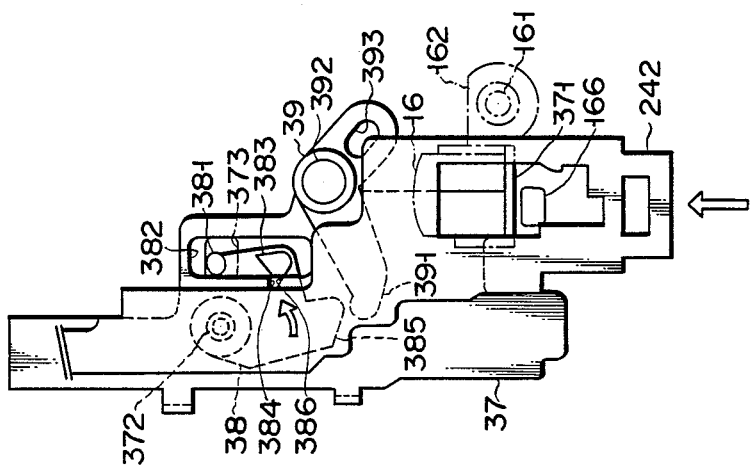
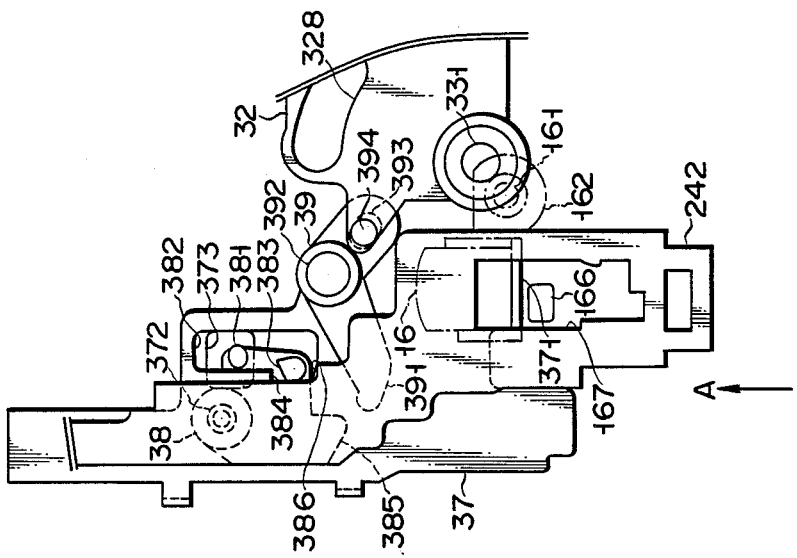

TAPE RECORDER HAVING SOFT-TOUCH CONTROL OF AN ERASE HEAD

BACKGROUND OF THE INVENTION

The present invention relates to a tape recorder and, more particularly, to a tape recorder utilizing "soft-touch" operation switches.

Various types of control buttons for a mechanical tape recorder have recently been furnished with a soft-touch operation mechanism to control tape transport functions. The soft-touch operation is performed by transporting movable members, such as a head chassis, into a predetermined position by a driving force of a motor, etc. without directly moving these members by the force of control buttons, thus decreasing the force required to depress the control buttons.

However, soft-touch operated buttons have not been highly developed as yet, and various problems remain unsolved. For example, a conventional soft-touch operation mechanism is large and involves a high power consumption, and has thus far been limited to only a large, high-quality tape deck. A strong demand exists for the development of a compact, lightweight soft-touch control mechanism with low power consumption which may be used for a battery-operated, portable, compact cassette tape recorder such as a cassette tape recorder with a radio. Furthermore, in addition to compactness, light weight, and low power consumption, a demand also exists for smooth operation of various types of movable members in a given sequence and provision of safeguards against the exhaustion of power in the batteries.

Recently, a tape recorder has appeared on the market which uses a magnet as an erase head. In this type of tape recorder, the erase head is moved, during the recording time, into contact with the tape and, during the play time, away from the tape. However, this tape recorder requires a complicated mechanism for movement of the head into and away from the tape in the record and play modes, respectively. In particular, the erase head is interlocked with the record button and play button, presenting a problem of inconvenient, "heavy touch" operation of these buttons.

SUMMARY OF THE INVENTION

The present invention has been made in consideration of the above situation, and provides a "soft-touch" operated, compact, lightweight, economical tape recorder wherein a magnetic erase head is brought into contact with or separated from a magnetic tape upon operation of a soft-touch operation mechanism in the record or play mode.

According to one aspect of the present invention, there is provided a tape recorder comprising:
a motor;
an erase head;
a record operating member for driving a tape in a record mode, and a play operating member for driving the tape in a play mode; and
an erase head control mechanism selectively interlocking with said record operating member and said play operating member and driven by a rotational force of said motor, said erase head control mechanism being adapted to be held in a first state where said erase head is brought into contact with the tape when said record operating member is operated and in a second state where the erase head is separated from the tape when said play operating member is operated.

BRIEF DESCRIPTION OF THE DRAWINGS

FIGS. 1 to 13 show a tape recorder according to an embodiment of the present invention; in which:
FIG. 1 is a plan view showing the overall construction of the cassette tape recorder to which the present invention is applied;
FIG. 2 is a plan view of the cassette tape recorder shown in FIG. 1 when a main chassis is removed therefrom;
FIG. 3 shows the relationship between a normal-speed drive gear and a normal-speed drive lever;
FIGS. 4 and 5 respectively show the relationships among a PLAY operation board, a REC operation board, and a normal-speed lock lever;
FIG. 6 is a plan view showing the relationships among a head slider, a pinch lever and a normal-speed drive lever,
FIG. 7 is a plan view showing a rotational force transmission relationship among a motor, a flywheel and a right reel table;
FIGS. 8 to 10 respectively show operating conditions of the mechanism shown in FIG. 3;
FIG. 11 shows a mechanism for bringing an erase head into tight contact with or separating it from a magnetic tape in the record or play mode; and
FIGS. 12 and 13 respectively show operating conditions of the mechanism shown in FIG. 11.

DETAILED DESCRIPTION OF THE PREFERRED EMBODIMENT

Figure 1:
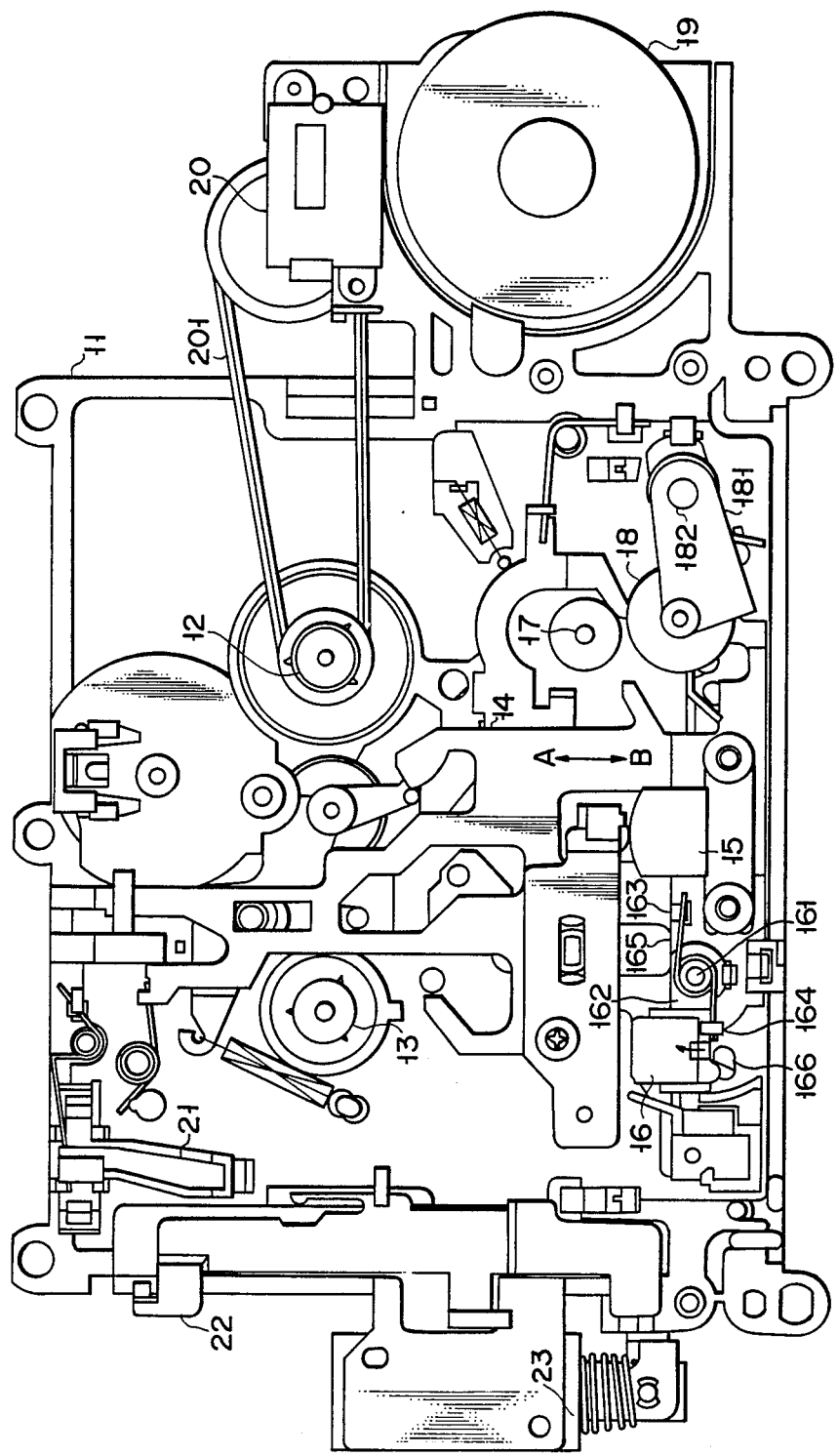
Figure 2:
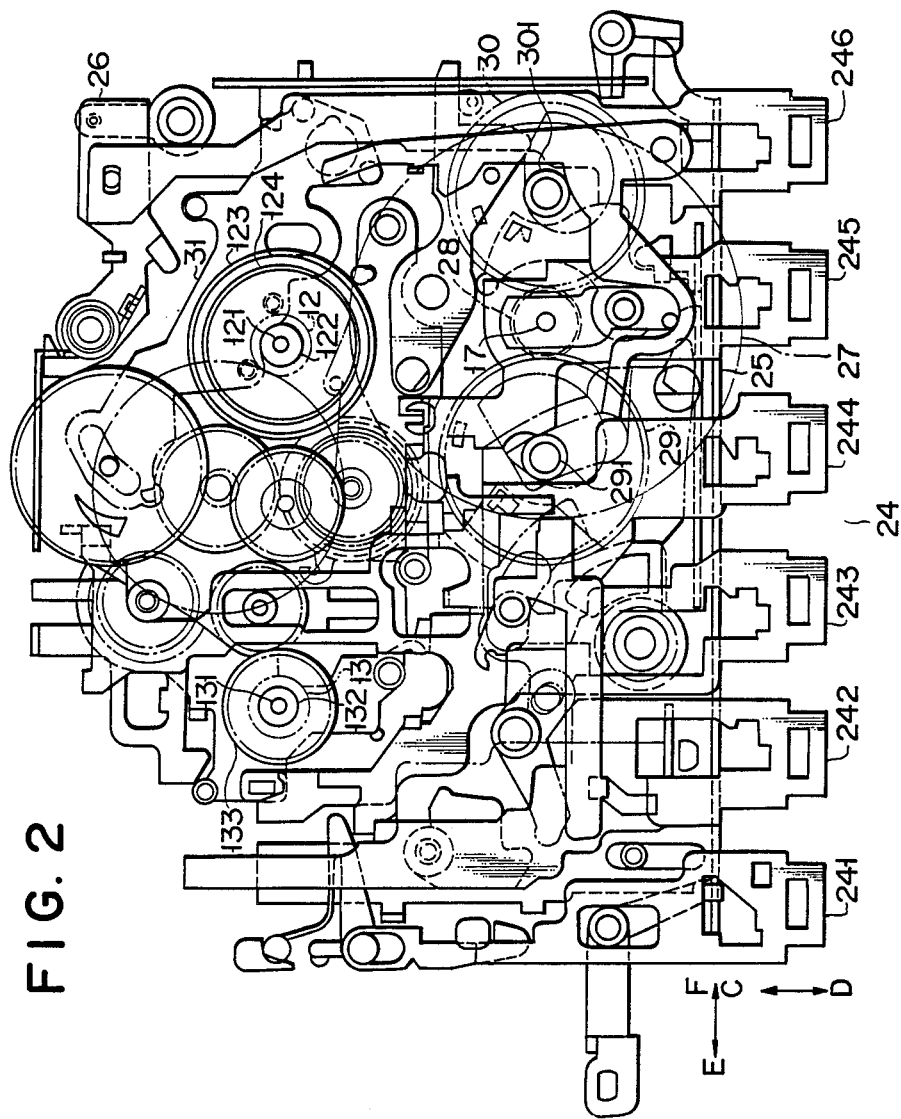

A tape recorder according to an embodiment of the present invention will be described with reference to the accompanying drawings. FIGS. 1 and 2 are a front view of a cassette tape recorder and a bottom view thereof when its main chassis is removed from the upper side.

Referring to FIG. 1, reference numeral 11 denotes a substantially box-shaped main chassis which is obtained by molding, for example, a plastic material. Right and left reel tables 12 and 13 on which a pair of reel hubs of a tape cassette (not shown) are mounted, are rotatably supported at substantially the central portion of the main chassis 11. A head slider 14 is supported between the right and left reel tables 12 and 13 to be slidable in the directions indicated by arrows A and B. A recording/reproducing head (to be referred to as a record/play head hereinafter) 15 and an erase head 16 are mounted next to each other at the lower portion in FIG. 1.

A capstan 17 is rotatably supported at the lower portion (FIG. 1) of the main chassis 11. The capstan 17 serves as a rotating shaft of a flywheel (to be described later) disposed on the lower surface of the main chassis 11. A pinch roller 18 is disposed in the vicinity of the capstan 17. The pinch roller 18 is rotatably supported at one end of a pinch lever 181. Since the other end of the pinch lever 181 is fitted around a pivot pin 182 extending from the main chassis, the pinch lever 181 is pivotal about the pivot pin 182. In particular, when the pinch lever 181 pivots clockwise (FIG. 1), the pinch roller 18 is brought into tight contact with the capstan 17.

A motor 19 is disposed at the rightmost portion (FIG. 1) of the main chassis 11. A tape counter 20 is disposed at a portion of the main chassis 11 above the motor 19 and is interlocked with the right reel table 12 through a belt 201.

A known accidental erase prevention lever 21, an eject slider 22 for holding a cassette cover (not shown) at a closed position and for releasing it from the closed position and keeping it at an open position, a solenoid plunger 23 for cuing (i.e., detecting a blank portion of the tape so as to locate a desired tape position), and so on are disposed at the leftmost portion (FIG. 1) of the main chassis 11.

Referring to FIG. 2, an operation section 24 is disposed at the lower portion so as to set the cassette tape recorder in a predetermined operating mode or a stop mode. The operation section 24 has a STOP operation board 241 for the stop/eject mode, a REC operation board 242 for the record mode, a REW operation board 243 for the rewind mode, a PLAY operation board 244 for the play mode, an FF operation board 245 for the fast forward mode, and a PAUSE operation board 246 for the pause mode, arranged from left to right in the order named. These boards are supported such that they can be depressed along the direction indicated by arrow C and can be released to their initial positions along the direction indicated by arrow D. A lock plate 25 is supported on the main chassis 11 to be slidable along the directions indicated by arrows E and F and is substantially perpendicular to the operation boards 241 to 246. The REC, REW, PLAY, and FF operation boards 242 to 245 among the operation boards 241 to 246 engage the lock plate 25 when they are depressed, and are locked at their depressed positions. The STOP operation board 241 may not be locked by the lock plate 25 but engages the lock plate 25 so as to release either one or two of operation boards 242 to 245 from the locked condition. The PAUSE operation board 246 does not engage the lock plate 25 and is independently operated. The PAUSE operation plate 246 engages a known push-push mechanism 26: when the operator depresses the PAUSE button, the PAUSE board 246 is locked in the depressed position; and when the operator depresses the PAUSE button again, the PAUSE board 246 is released and returns to its unlocked position. In this state, the play mode, for example, is restarted.

The REW and FF operation boards 243 and 245 drive a high-speed drive mechanism so as to selectively rotate the left reel table 13 or the right reel table 12 clockwise or counterclockwise (FIG. 1) at a high speed. Therefore, the magnetic tape is rewound or fast forwarded. The PLAY operation board 244 drives a normal-speed drive mechanism (to be described later) to slide the head slider 14 in the direction indicated by arrow A, so that the record/play head 15 is brought into tight contact with a magnetic tape (not shown). At the same time, the pinch roller 18 is brought into tight contact with the capstan 17 through the magnetic tape. Subsequently, the right reel table 12 is rotated counterclockwise in FIG. 1 so as to allow tape travel in the play mode. The REC operation board 242 drives the normal-speed drive mechanism so as to move the record/play head 15 and rotate the pinch roller 18 and the right reel table 12 in the same manner as in the play mode. A tape recorder circuit (not shown) is switched to the record mode so as to transport the magnetic tape for recording. In this case, the REC operation board 242 need not be operated together with the PLAY operation board 244, so the operator need only depress the REC button of the REC operation board 242 so as to set the record mode. The erase head 16 interlocks with the head slier 14 only in the recording mode and is brought into tight contact with the tape, together with the record/play head 15. In the play mode, the erase head 16 cannot be brought into contact with the magnetic tape.

As shown in FIG. 2, a flywheel 27 and a drive gear 28 are coaxially mounted on the capstan 17. The capstan 17, the flywheel 27 and the drive gear 28 rotate integrally with each other. A normal-speed drive gear 29 and a high-speed drive gear 30 are rotatably supported on rotating shafts 291 and 301, respectively, at either side of the drive gear 28. The normal- and high-speed drive gears 29 and 30 mesh with the drive gear 28 for rotation therewith. A notch (to be described later) is formed at part of each of the normal- and high-speed drive gears 29 and 30. Normally, the notches of the normal- and high-speed drive gears 29 and 30 oppose the drive gear 28, so that the normal- and high-speed drive gears 29 and 30 cannot rotate.

When a normal-speed tape travel operation board, such as the REC or PLAY operation boards 242 or 244, is operated, the normal-speed drive gear 29 meshes with the drive gear 28 and is driven thereby. Upon rotation of the normal-speed drive gear 29, the head slider 14 and the pinch roller 18 are moved to predetermined positions, so that the right reel table 12 rotates. As a result, the magnetic tape is driven at the normal speed. When a high-speed tape travel operation board such as the REW and FF operation boards 243 and 245 is operated, the high-speed drive gear 30 meshes with the drive gear 28. Upon rotation of the high-speed drive gear 30, the right reel table 12 or the left reel table 13 is selectively rotated, thereby driving the magnetic tape at a high speed. Furthermore, the high-speed drive gear 30 meshes with the drive gear 28 and rotates when the PAUSE operation board 246 is operated.

The right and left reel tables 12 and 13 are disposed such that the reel shafts 121 and 131 are fitted in cylindrical bearings 122 and 132 in the main chassis 11, respectively. A normal-speed gear 123 and FF gear 124 which are coaxially rotated integral with the right reel table 12 are overlaid and mounted on the reel table 12. A REW gear 133 is coaxial with the left reel table 13 and is mounted on the reel table 13. The REW gear 133 rotates together with the left reel table 13. Various types of gears (to be described later) may be selectively meshed with the gears 123, 124 and 133, so that the right or left reel table 12 or 13 may be driven. An automatic stop mechanism (to be referred to as an ASO mechanism) 31 is disposed in the vicinity of the right reel table 12.

The overall structure and operation of the cassette tape recoder have been described above. A detailed description of the structure and operation of the cassette tape recorder will now follow. First, the normal-speed drive mechanism will be described with reference to FIG. 3. FIG. 3 shows a detailed structure of the normal-speed drive gear 29. A notch 292, as previously described, is formed at part of the normal-speed drive gear 29 to subtend an angle of about 90° with respect to the center of the normal-speed drive gear 29. A cam 293 is formed at one side of the normal-speed drive gear 29. Two stoppers 294 and 295 are formed at the other side of the normal-speed drive gear 29. The cam 293 comprises a flat first portion 296 and an arcuated second portion 297. The stopper 294 is formed at an outer peripheral portion of the normal-speed drive gear 29, and the stopper 295 is formed at an inner peripheral portion thereof. The stoppers 294 and 295 are formed to subtend an angle of about 45° with respect to the center of the normal-speed drive gear 29.

A normal-speed drive lever 32 can engage the cam 293, and a normal-speed lock lever 33 can engage the stoppers 294 and 295. The normal-speed drive lever 32 and the normal-speed lock lever 33 are coaxially mounted on a pivot pin 331 extending on the main chassis 11, so as to pivot about the pivot pin 331. The normal-speed drive lever 32 comprises: a substantially U-shaped thick portion 321 having a proximal portion which is fitted around the pivot pin 331; and a thin portion 322 having an opening therein. The thin portion 322 opposes the cam 293. The inner surface of one arm 323 of the thick portion 321 of the normal-speed drive lever 32 constitutes an engaging portion 324 which abuts the cam 293. A drive portion 326 is formed at the distal end of the other arm 325 of the thick portion 321 so as to move the head slider 14. An elongated hole 327 is formed in the thin portion 322 so as not to prevent pivotal movement of the normal-speed drive lever 32 with respect to the rotating shaft 291 of the normal-speed drive gear 29. The normal-speed drive lever 32 is biased by a torsion spring (not shown, but described later) clockwise in FIG. 3, so that the engaging portion 324 of the arm 323 is in tight contact with the cam 293.

A lock portion 332 extends from the normal-speed lock lever 33 so as to selectively engage the stoppers 294 and 295 of the normal-speed drive gear 29, thereby preventing rotation of the normal-speed drive gear 29. The normal-speed lock lever 33 is biased clockwise (in FIG. 3) by a spring (not shown). The normal-speed lock lever 33 is pivoted clockwise (FIG. 3) until the lock portion 332 engages with the stopper 294 of the normal-speed drive gear 29. When the lock portion 332 of the normal-speed lock lever 33 is stopped by the stopper 294 of the normal-speed drive gear 29, the notch 292 of the normal-speed drive gear 29 opposes the drive gear 28. In this condition, the engaging portion 324 of the normal-speed drive lever 32 urges the first (flat) portion 296 of the cam 293, thereby biasing the normal-speed drive gear 29 clockwise in FIG. 3. However, since the lock portion 332 of the normal-speed lock lever 33 abuts against the stopper 294 of the normal-speed drive gear 29, the normal-speed drive gear 29 does not rotate and thus does not mesh with the drive gear 28.

In the above condition, when the REC or PLAY operation board 242 or 244 is operated, the lock portion 332 of the normal-speed lock lever 33 disengages from the stopper 294 of the normal-speed drive gear 29 in a manner to be described later. For this reason, the normal-speed drive gear 29 is rotated clockwise (FIG. 3) by the urging force applied through the normal-speed drive lever 32, and meshes with the drive gear 28.

Figure 5:
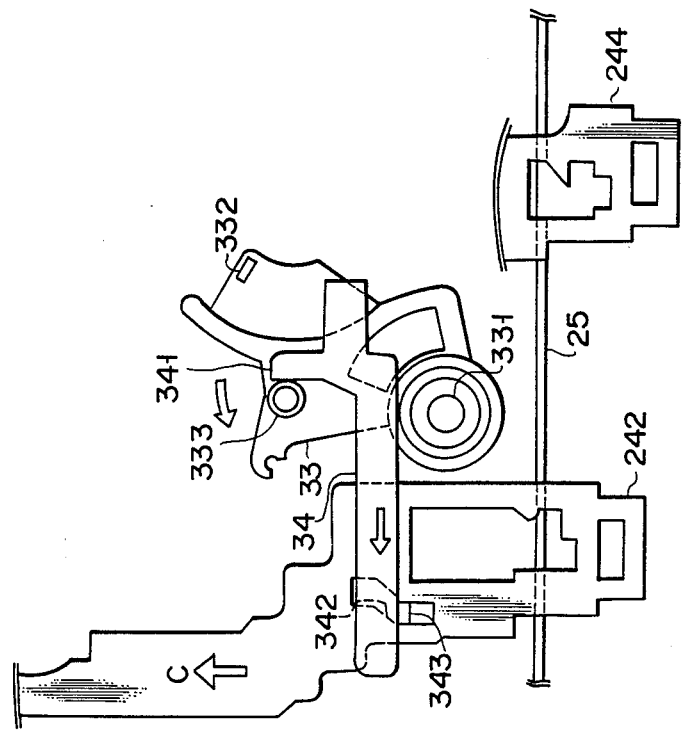

FIGS. 4 and 5 illustrate operating conditions showing the positional relationships among the PLAY operation board 244, the REC operation board 242, and the normal-speed lock lever 33. Referring to FIG. 4, a substantially columnar engaging portion 333 extends outward from the normal-speed lock lever 33. A projection 334 is formed at one side of the PLAY operation board 244 so as to engage the engaging portion 333 of the normal-speed lock lever 33. The projection 334 has a slanted portion 335 which does not interfere with the engaging portion 333 of the normal-speed lock lever 33 when the PLAY operation board 244 is moved in the direction indicated by arrow C in FIG. 4. For this reason, when the PLAY operation board 244 is operated, the engaging portion 333 is urged by the slanted portion 335, so that the normal-speed lock lever 33 is pivoted counterclockwise in FIG. 4. As a result, the lock portion 332 of the normal-lock lever 33 is released from the stopper 294 of the normal-speed drive gear 29. When the PLAY operation board 244 is locked with the lock plate 25 in the play mode, the normal-speed lock lever 33 is held at a position obtained by pivotal movement in the counterclockwise direction (FIG. 4). When the normal-speed lock lever 33 is held in this manner, the lock portion 332 is positioned in a path along which the outer surface of the stopper 295 of the normal-speed drive gear 29 rotates.

Referring to FIG. 5, the REC operation board 242 engages a REC drive slider 34 disposed in the operative direction thereof (i.e., in the direction perpendicular to the direction indicated by arrow C in FIG. 5). The REC drive slider 34 is slidably supported on the main chassis 11 and is biased by a spring (not shown) to the right in FIG. 5. An engaging portion 341 is formed at one end of the REC drive slider 34 to engage the engaging portion 333 of the normal-speed lock lever 33. A bent engaging piece 343 is formed at the other end of the REC drive slider and may be loosely fitted in a guide hole 342 formed in the REC operation board 242. The guide hole 342 of the REC operation board 242 is formed such that the REC drive slider 34 is slid to the left (FIG. 5) when the REC operation board 242 is moved along the direction indicated by arrow C (FIG. 5). For this reason, when the REC operation board 242 is moved, the REC drive slider 34 is slid to the left in FIG. 5 and the engaging portion 333 of the normal-speed lock lever 33 is urged by the engaging portion 341. As a result, the normal-speed lock lever 33 is pivoted counterclockwise in FIG. 5, and the lock portion 332 of the normal-speed lock lever 33 is disengaged from the stopper 294 of the normal-speed drive gear 29. In this state, when the REC operation board 242 is locked by the lock plate 25, the normal-speed lock lever 33 is held at a position after being pivoted counterclockwise in FIG. 5. When the normal-speed lock lever 33 is held in this manner, the lock portion 332 is positioned in a path along which the outer surface of the normal-speed drive gear 29 rotates.

The normal-speed lock lever 33 is pivoted by the same distance in both the play and record modes. An elongated hole 328 is formed in the thick portion 321 of the normal-speed drive lever 32 so as to pivot the normal-speed drive lever 32 and the normal-speed lock lever 33 without engaging the engaging portion 333 of the normal-speed lock lever 33.

Figure 6:
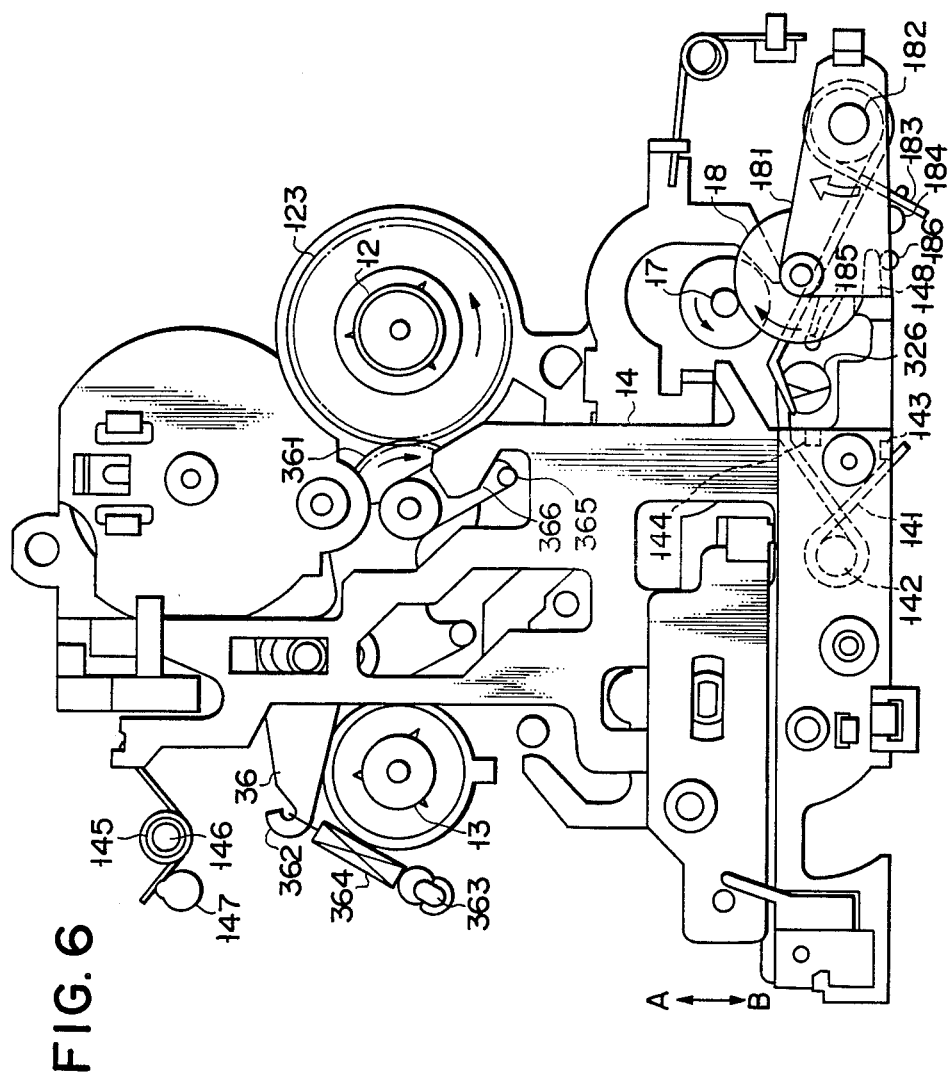

The drive portion 326 of the normal-speed drive lever 32 extends to the upper side of the main chassis through a through hole such that the drive portion 326 is loosely fitted in the through hole formed in the main chassis 11. As shown in FIG. 6, one end of a torsion spring 141 disposed on the head slider 14 engages the drive portion 326, and at the same time one end of a torsion spring 183 disposed on a pinch lever 181 engages the drive portion 326. The central portion of the torsion spring 141 is wound around a support pin 142 disposed at a portion where the record/play head 15 of the head slider 14 is mounted. The two ends of the torsion spring 141 are stopped in the stop mode by stoppers 143 and 144 formed in the head slider 14. In this condition, the torsion spring 141 does not apply any biasing force to slide the head slider 14. One end of a torsion spring 145 engages the upper portion (FIG. 6) of the head slider 14. The central portion of the torsion spring 145 is wound around a support pin 146 extending upward from the main chassis 11. The other end of the torsion spring 145 is stopped by a stopper 147 extending from the main chassis 11, so that the torsion spring 145 urges the head slider 14 in the direction indicated by arrow B. For this reason, the head slider 14 is moved in the direction indicated by arrow B (FIG. 6) in the stop mode. The one end of the torsion spring 141 urges the drive portion 326 of the normal-speed drive lever 32. As previously described with reference to FIG. 3, the normal-speed drive lever 32 is biased clockwise in FIG. 3. In other words, the normal-speed drive lever 32 is biased clockwise (FIG. 3) by the torsion spring 145.

The central portion of the torsion spring 183 is wound around a pivot pin 182 of the pinch lever 181. The two ends of the torsion spring 183 are respectively stopped by stoppers 184 and 185 extending on the pinch lever 181. The torsion spring 183 does not apply any biasing force to the pinch lever 181. An engaging portion 148 is formed at the lower right portion (FIG. 6) of the head slider 14 so as to engage a projection 186 extending downward from the pinch lever 181. Therefore, in the stop mode wherein the head slider 14 is displaced in the direction indicated by arrow B in FIG. 6, the pinch lever 181 is pivoted counterclockwise (FIG. 6) and is held at this pivoted position so as to separate the pinch roller 18 from the capstan 17.

Figure 7:
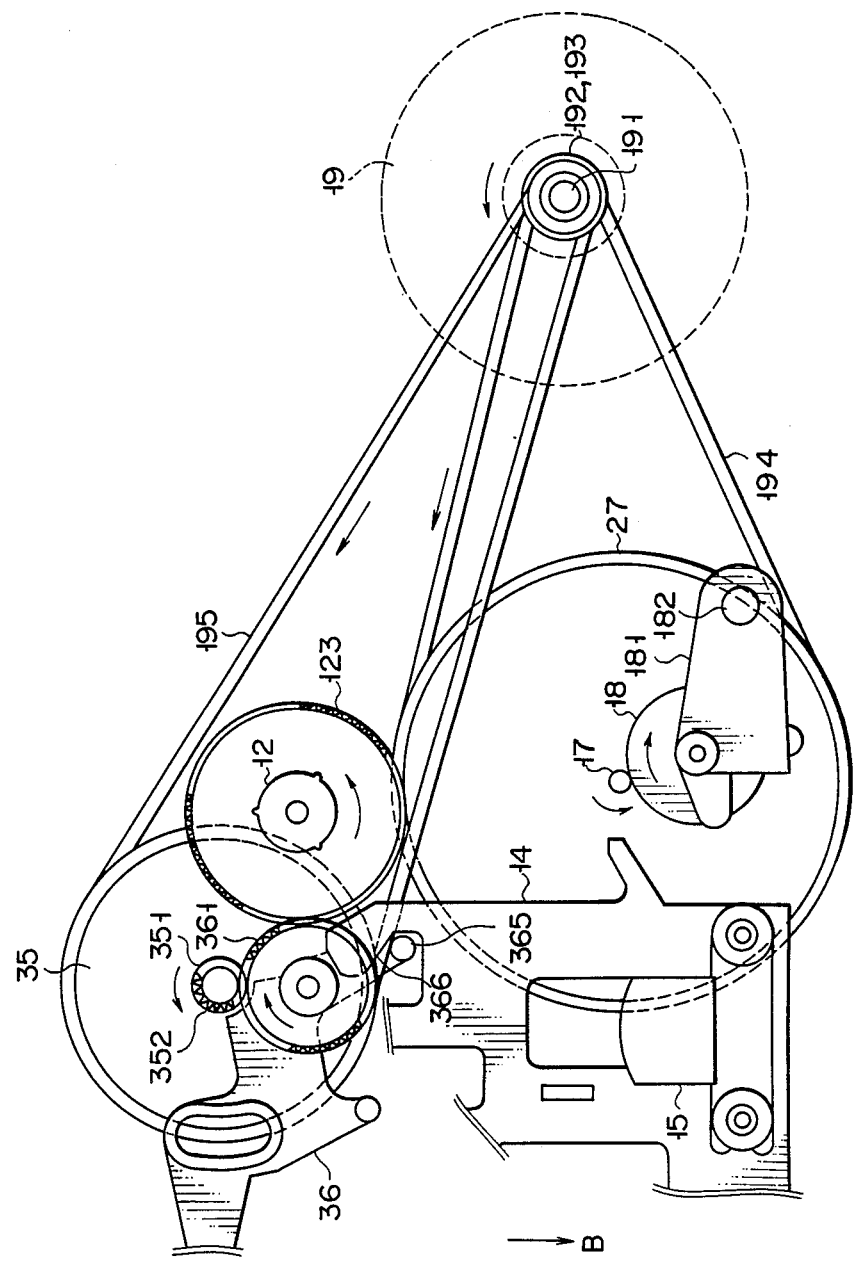

As shown in FIG. 7, motor pulleys 192 and 193 are coaxially fitted around a rotating shaft 191 of the motor 19. The motor pulley 192 is coupled to the motor 19 so as to freely transmit the rotational force of the motor 19 to the flywheel 27 through a belt 194. The motor pulley 193 is coupled to the motor 19 so as to freely transmit the rotational force of the motor 19 to a center pulley 35 through a belt 195. The center pulley 35 is rotatably supported on the main chassis 11. A center gear 351 is integrally formed with the center pulley 35 so as to be coaxial therewith. A normal-speed plate 36 is disposed in the vicinity of the center pulley 35. The normal-speed plate 36 is supported on the main chassis 11 to pivot about a rotating shaft 352 of the center pulley 35. A power transmission gear 361 is rotatably mounted on the normal-speed plate 36 and meshes with the center gear 351. The normal-speed plate 36 pivots about the rotating shaft 352 of the center pulley 35. As a result, the gear 361 constantly meshes with the gear 351 even when the normal-speed plate 36 is pivoted.

The normal-speed plate 36 is biased counterclockwise (FIG. 6) by a coil spring 364 mounted between an engaging hook 362 formed at one end of the normal-speed plate 36 and an engaging portion 363 formed on the main chassis 11. The power transmission gear 361 meshes with the normal-speed gear 123 of the right reel table 12. An engaging portion 365 extends at one end of the normal-speed plate 36. The upper end portion (FIG. 7) of the head slider 14 has an engaging portion 366 which has a tilt surface so as to engage with the engaging portion 365 from the upper to the lower side (FIG. 7). In the stop mode, since the head slider 14 is moved in the direction indicated by arrow B (FIG. 7), the engaging portion 366 of the head slider 14 urges the engaging portion 365 of the normal-speed plate 36. The normal-speed plate 36 is pivoted clockwise (FIG. 7) against the biasing force of the spring 364, so that the power transmission gear 361 is separated from the normal-speed gear 123.

As described with reference to FIG. 6, in the stop mode the head slider 14 is urged downward by the torsion spring 145 along the direction indicated by arrow B (FIG. 6). Accordingly, the pinch lever 181 is held in the position where it is pivoted counterclockwise in FIG. 6. The pinch roller 18 is thus separated from the capstan 17. At the same time, the normal-speed plate 36 is pivoted clockwise in FIG. 7, so that the power transmission gear 361 is separated from the normal-speed gear 123. In the stop mode, assume that the PLAY operation board 244 is operated so as to set the cassette tape recorder in the play mode in the manner as shown in FIG. 4. As previously described, the normal-speed lock lever 33 is pivoted counterclockwise in FIG. 4, so that the lock portion 332 of the normal-speed lock lever 33 is separated from the stopper 294 of the normal-speed drive gear 29, as shown in FIG. 3. The normal-speed drive gear 29 then meshes with the drive gear 28.

Figure 8:
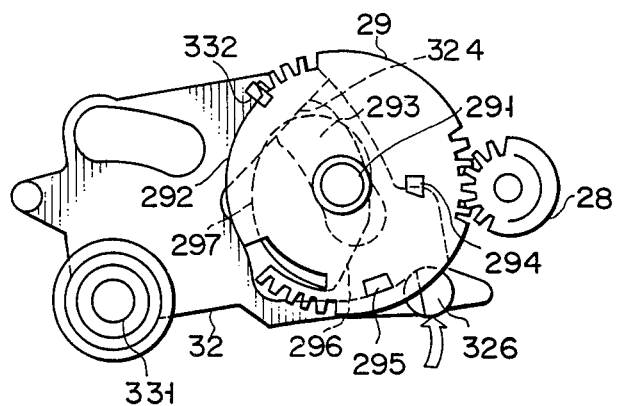

When the PLAY operation board 244 is operated, a power leaf switch is turned on through a switch slider (not shown). The motor 19 is then started, and the flywheel 27 and the center pulley 35 are rotated counterclockwise in FIG. 7. It should be noted that the power leaf switch controls the REC, REW, and FF operation boards 242, 243 and 245 in addition to the PLAY operation board 244, through the switch slider. When the flywheel 27 is rotated, the drive gear 28 is rotated counterclockwise in FIG. 3. For this reason, as shown in FIG. 8, the normal-speed drive gear 29 is rotated clockwise (FIG. 8) by the rotational force of the drive gear 28. The second, arcuated portion 297 of the cam 293 formed on the normal-speed drive gear 29 urges the engaging portion 324 of the normal-speed drive lever 32. As a result, the normal-speed drive lever 32 is pivoted counterclockwise in FIG. 8.

The drive portion 326 of the normal-speed drive lever 32 urges upward (FIG. 6) both the one end of the torsion spring 141 disposed in the head slider 14 and the one end of the torsion spring 183 disposed in the pinch lever 181. Therefore, the head slider 14 is slid against the biasing force of the torsion spring 145 in the direction indicated by arrow A in FIG. 6. The pinch lever 181 is pivoted clockwise (FIG. 6) through the torsion spring 183.

Figure 9:
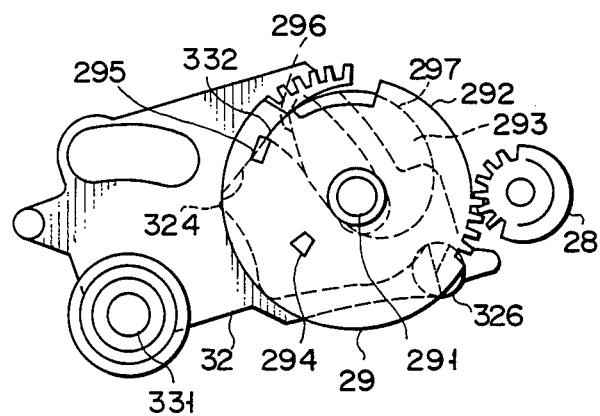

As shown in FIG. 9, when the normal-speed drive gear 29 is rotated by $\frac{3}{4}$ revolution and the notch 292 thereof is about to oppose the drive gear 28, the normal-speed drive lever 32 is pivoted counterclockwise and is held in the pivoted position.

In this case, the head slider 14 is slid in the direction indicated by arrow A in FIG. 6 until the record/play head 15 mounted on the head slider 14 is brought into proper contact with the magnetic tape at an optimum pressure in the following manner. An engaging portion (not shown) which corresponds to an optimum position of the head slider 14 is formed in the main chassis 11 and is abutted against the head slider 14. The pinch lever 181 is pivoted clockwise (FIG. 6) until the pinch roller 18 abuts the capstan 17. The stroke of the normal-speed drive lever 32, to be moved to a position shown in FIG. 9, is set to be longer than each of the strokes of the head slider 14 and the pinch lever 181. When the normal-speed drive lever 32 is pivoted to the position shown in FIG. 9, its drive portion 326 urges both the one end of the torsion spring 141 disposed on the head slider 14 and the one end of the torsion spring 183 disposed on the pinch lever 181 upward so as to separate them from the stopper 144 of the head slider 14 and the stopper 185 of the pinch lever 181, respectively. The torsion springs 141 and 183 apply biasing forces to the head slider 14 and the pinch lever 181. The head slider 14 is held by the biasing force of the torsion spring 141 in a position where the record/play head 15 is in proper contact with the magnetic tape at an optimum pressure. The pinch roller 18 is urged by the biasing force of the torsion spring 183 such that the pinch roller 18 is brought into tight contact with the capstan 17 through the magnetic tape.

In this condition, a sum of biasing forces of the torsion springs 141, 183 and 145 is applied to the normal-speed drive lever 32 through the drive portion 326. The normal-speed drive gear 29 is slightly rotated clockwise (FIG. 9) by the rotational force of the drive gear 28 from the position shown in FIG. 9. As a result, as shown in FIG. 10, the engaging portion 324 of the normal-speed drive lever 32 opposes a boundary between the first (flat) and second (arcuated) portions 296 and 297 of the cam 293 of the normal-speed drive gear 29.

As previously described, when the normal-speed drive gear 29 is positioned as shown in FIG. 9, the sum of the biasing forces of the torsion springs 141, 183 and 145 is applied to the normal-speed drive lever 32 and is transmitted to the rotating shaft 291 through the cam 293. Before the normal-speed drive gear 29 is positioned as shown in FIG. 9 (i.e., the drive gear 29 is being rotated), the biasing force applied to the normal-speed drive lever 32 is applied to the cam 293. Although the normal-speed drive gear 29 is biased at the position shown in FIG. 8 so as to rotate counterclockwise, the normal-speed drive gear 29 is rotated clockwise (FIG. 8) by the rotating force of the drive gear 28 against the biasing force applied to the normal-speed drive lever 32. However, the cam 293 receives the biasing force applied to the normal-speed drive lever 32 when the normal-speed drive gear 29 is positioned as shown in FIG. 9, so that the normal-speed drive gear 29 is biased to rotate clockwise (FIG. 10). The shape of the cam 293 and the position of the rotating shaft 291 are determined so as to perform the above operation.

Figure 10:
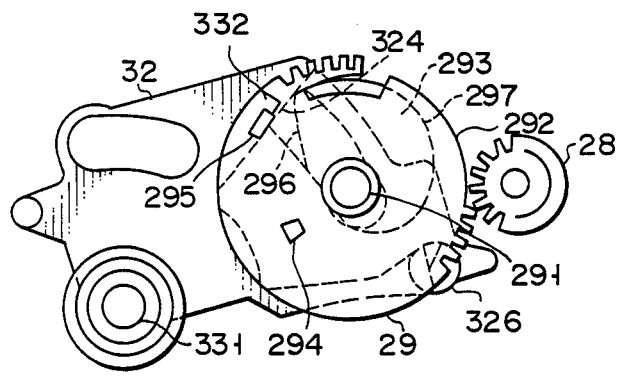

In the condition shown in FIG. 10, the normal-speed drive gear 29 is biased so as to rotate clockwise. However, since the stopper 295 of the normal-speed drive gear 29 is stopped by the lock portion 332 of the normal-speed lock lever 33, the normal-speed drive gear 29 may not rotate. As a result, the normal-speed drive gear 29 and the normal-speed drive lever 32 are securely held at the respective positions shown in FIG. 10. In this condition, the notch 292 of the normal-speed drive gear 29 completely opposes the drive gear 28, so that the driving force from the drive gear 28 is not transmitted to the normal-speed drive gear 29. Therefore, the head slider 14 and the pinch roller 18 are properly held at the respective positions shown in FIG. 6.

When the head slider 14 is slid in the direction indicated by arrow A, the engaging portion 366 thereof is separated from the engaging portion 365 of the normal-speed plate 36. The normal-speed plate 36 is pivoted counterclockwise (FIG. 6) by the biasing force of the spring 364. As shown in FIG. 7, the transmission gear 361 meshes with the normal-speed gear 123, so that the rotational force of the motor 19 is transmitted to the right reel table 12 through the motor pulley 193, the belt 195, the center pulley 35, the center gear 351, the transmission gear 361, and the normal-speed gear 123. As a result, the right reel table 12 is rotated counterclockwise in FIG. 7 and the magnetic tape travels in the play mode direction.

When the STOP operation board 241 is operated in the play mode, the PLAY operation board 244 locked by the lock plate 25 is released. The PLAY operation board 244 is slid downward in FIG. 4 and returns to the nonoperative position. In this condition, the normal-speed lock lever 33 is pivoted clockwise in FIG. 4 and returns to the nonoperative position. For this reason, as shown in FIG. 10, the lock portion 332 of the normal-speed lock lever 33 which has been stopped by the stopper 295 of the normal-speed drive gear 29 is separated from the stopper 295. Since the normal-speed drive gear 29 is biased clockwise in FIG. 10 through the normal-speed drive lever 32, the normal-speed drive gear 29 is rotated clockwise in FIG. 1 until the stopper 294 thereof is stopped by the lock portion 332 of the normal-speed lock lever 33.

In this manner, the normal-speed drive gear 29 returns to the (nonoperative) stop position. Upon this movement, the normal-speed drive lever 32 is pivoted clockwise and is held in the initial position as shown in FIG. 10. The head slider 14 is slid along the direction indicated by arrow B (FIG. 6) and the pinch lever 181 is rotated counterclockwise (FIG. 6). Upon movement of the head slider 14 and the pinch lever 181, the normal-speed plate 36 is pivoted clockwise in FIG. 7. The record/play head 15 is separated from the tape, so that the pinch roller 18 is separated from the capstan 17. At the same time, the transmission gear 361 is separated from the normal-speed gear 123, thereby setting the stop mode.

Assume that the REC operation board 242 is moved in the condition shown in FIG. 5 so as to change the operating mode of the tape recorder from the stop mode to the record mode. As previously described, the normal-speed lock lever 33 is pivoted counterclockwise (FIG. 5). The head slider 14 and the pinch roller 18 are kept in their predetermined positions (FIG. 6) in the same manner as in the play mode. At the same time, the transmission gear 361 meshes with the normal-speed gear 123, thereby driving the magnetic tape. In the record mode, the erase head 16 is in contact with the tape, and a mechanism for bringing the erase head 16 into tight contact with or separating it from the tape will be described in detail later.

In the record mode, when the STOP operation board 241 is operated, the REC operation board 242 locked by the lock plate 25 is released, as shown in FIG. 5. The REC operation plate 242 is slid downward (FIG. 5) and returns to the nonoperative position. The REC drive slider 34 is then slid to the right (FIG. 5), and the normal-speed lock lever 33 is pivoted clockwise (FIG. 5). As previously described, the head slider 14, the pinch lever 181, the normal-speed plate 36 and the like return to their respective initial positions. As a result, the stop mode is set.

As previously described, in the cassette tape recorder, the erase head 16 cannot be brought into contact with the tape in the play mode. However, the erase head 16 is in contact with the tape in the record mode. This can be accomplished since a magnetic erase head using a permanent magnet is used as the erase head 16. The method of bringing the erase head 16 into contact with or separating it from the tape in the record or play mode will now be described. Referring again to FIG. 1, the erase head 16 is mounted at one end of an erase head lever 162, the other end of which is pivotally mounted on a pivot pin 161 disposed on the head slider 14. The erase head lever 162 is biased clockwise (FIG. 1) by a torsion spring 165. The central portion of the torsion spring 165 is wound around the pivot pin 161.

The two ends of the torsion spring 165 are stopped by a stopper 163 formed in the head slider 14 and a stopper 164 formed in the erase head lever 162, respectively. The erase head lever 162 can be pivoted until it reaches the position shown in FIG. 1.

A substantially columnar control portion 166 extends at an erase head mounting portion (corresponding to the lower portion in FIG. 1) of the erase head lever 162. The control portion 166 is loosely fitted in a through hole (not shown) formed in the main chassis 11 and a through hole 167 formed in the REC operation board 242 as shown in FIG. 11. The control portion 166 thus extends to a position at which the control portion 166 can engage a bent engaging piece 371 formed at a portion (corresponding to the lower portion in FIG. 11) of a REC slider 37 disposed next to the REC operation board 242. The REC slider 37 is supported on the main chassis 11 to be slidable along the vertical direction in FIG. 11. The REC slider 37 is biased downward (FIG. 11) by a spring (not shown), and is slid downward in FIG. 11 until it is positioned slightly above the control portion 166 of the erase head lever 162. When the REC slider 37 is slid upward in FIG. 11 and is held there, it causes a REC switch (not shown) to turn on so as to switch a tape recorder circuit section (not shown) to the record mode.

A pivot pin 372 is mounted at substantially the center of the REC slider 37. A REC lever 38 is pivotal about the pivot pin 372. A projection 381 is formed at one side of the REC slider 37 so as to be loosely fitted in a through hole 373 formed in the REC slider 37. An engaging portion 383 indicated by the hatched line in FIG. 11 is formed at one side of the REC lever 38 so as to be loosely fitted in a guide groove 382 formed in the main chassis 11. The engaging portion 383 is located below the projection 381, as shown in FIG. 11. The guide groove 382 has a rectangular shape and is formed along the vertical direction in FIG. 11. A step 384 is formed to the left (FIG. 11) of the guide groove 382. The REC lever 38 is constantly biased clockwise in FIG. 11 by a spring (not shown). The REC lever 38 is pivoted until the engaging portion 383 thereof abuts against the left side wall of the guide groove 382. An engaging portion 385 extends from the REC lever 38 at the lower portion in FIG. 11.

A drive portion 391 is formed at one end of a REC drive lever 39 which corresponds to the lower portion of the engaging portion 385 of the REC lever 38 in FIG. 11. The REC drive lever 39 is substantially L-shaped. The corner of the REC drive lever 39 is pivotal about a pivot pin 392 disposed on the main chassis 11. When the REC drive lever 39 is pivoted clockwise in FIG. 11, the drive portion 391 abuts against the engaging portion 385 of the REC lever 38. However, as shown in FIG. 11, when the engaging portion 383 of the REC lever 38 abuts against the left side wall of the guide groove 382, the engaging portion 385 of the REC lever 38 does not oppose the drive portion 391 of the REC drive lever 39, so that engagement therebetween is not allowed. An elongated hole 393 is formed at the other end of the REC drive lever 39. A projection 394 formed at the end of the normal-speed drive lever 32 is loosely fitted in the elongated hole 393. A tilt portion 386 is formed at one side of the REC operation board 242 so as to engage the engaging portion 383 of the REC lever 38 and to pivot the REC lever 38 counterclockwise in FIG. 11 when the REC operation board 242 is moved in the direction indicated by arrow A and is held there.

When the REC operation board 242 is moved in the direction indicated by arrow A in the condition shown in FIG. 11, the engaging portion 383 of the REC lever 38 is urged by the tilt portion 386 of the REC operation board 242, as shown in FIG. 12. As a result, the REC lever 38 is pivoted counterclockwise in FIG. 12. In this condition, the engaging portion 383 of the REC lever 38 does not oppose the step 384 of the guide groove 382, and the engaging portion 385 of the REC lever 38 opposes the drive portion 391 of the REC drive lever 39. As previously described, when the REC operation board 242 is operated, the normal-speed drive lever 32 is pivoted counterclockwise in FIG. 11. Upon pivotal movement of the normal-speed drive lever 32, the REC drive lever 39 is pivoted clockwise in FIG. 13. The drive portion 391 of the REC drive lever 39 urges the engaging portion 385 of the REC lever 38 upward, so that the REC slider 37 is slid in the direction indicated by arrow A in FIG. 13. The head slider 14 is slid to the position shown in FIG. 6 upon movement of the normal-speed drive lever 32. The erase head 16 mounted on the head slider 14 through the erase head lever 162 is slid together with the head slider 14 and is brought into contact with the tape.

On the other hand, when the PLAY operation board 244 is operated in the condition shown in FIG. 11, the REC drive lever 39 is pivoted clockwise (FIG. 11) through the normal-speed drive lever 32. However, since the drive portion 391 of the REC drive lever 39 does not oppose the engaging portion 385 of the REC lever 38, the drive portion 391 does not abut against the engaging portion 385. As a result, the REC slider 37 cannot be slid in the direction indicated by arrow A in FIG. 11. The head slider 14 is slid by the normal-speed drive lever 32 to the position shown in FIG. 6. Referring to FIG. 11, the pivot pin 161 of the erase head lever 162, and hence the erase head lever 162, tend to move in the direction indicated by arrow A in FIG. 11. However, since the REC slider 37 is not slid in the direction indicated by arrow A in FIG. 11, the control portion 166 of the erase head lever 162 abuts the bent engaging piece 371 of the REC slider 37. The erase head lever 162 is then pivoted counterclockwise (FIG. 11) against the biasing force of the torsion spring 165 shown in FIG. 1. As a result, the erase head 16 may not contact the tape.

According to the construction shown in FIG. 11, in order to control the position of the erase head 16 in the record or play mode, the REC slider 37 is slid using the driving force of the normal-speed drive lever 32 so as to move the head slider 14. Therefore, the operation of the REC or PLAY operation board 242 or 244 can be effectively performed, thus allowing soft-touch operation. In particular, when the magnetic erase head is used as the erase head 16, the circuit section of the tape recorder becomes simple. Connecting wires between the erase head 16 and the tape recorder circuit section are eliminated. The head slider 14 may not thus receive an excessive pressure from the connecting wires. However, in the conventional tape recorder, a means for directly coupling the erase head to the REC button and the PLAY button is used as a means for controlling the position of the magnet erase head in the record or play mode. The REC and PLAY buttons must be depressed with a greater force and cannot provide "soft" or "feather-touch" operation.

As shown in FIG. 11, since the REC slider 37 is slid using the driving force of the normal-speed drive lever 32 so as to control the position of the erase head 16, the REC and PLAY operation boards 242 and 244 can be moved with a small load. Thus, the present invention can be applied to a soft-touch operated cassette tape recorder using a magnetic erase head.

What we claim is:

1. A tape recorder having soft-touch control of an erase head, comprising:
    a motor;
    a record operating member and a play member which are movable between a first position corresponding to a non-play/record condition of the tape recorder, and a second position corresponding to a play/record condition of the tape recorder;
    a first rotary body which is rotated by a turning force transmitted from said motor when one of said record operating member and said play operating member is moved to said second position, said first rotary body including a cam;
    a record/play head;
    a head slider which supports said record/play head and follows said cam to bring said record/play head to a position where said record/play head contacts a tape when said first rotary body is rotated;
    a magnetic erase head movable between a first position where said erase head does not contact said tape, and a second position where said erase head contacts said tape in accordance with movement of said head slider, but freely movable with respect to said head slider;
    a recording drive lever driven by following said cam when said first rotary body is rotated;
    a recording lever which is moved to a first position where it is out of engagement with said recording drive lever when said record operating member is in said first position, and to a second position where said recording lever is in engagement with said recording drive lever when said record operating member is in said second position; and
    an erase head control mechanism which moves in accordance with movement of said head slider to (a) permit said erase head to be moved to said second position where said erase head contacts said tape when said recording lever engages with said recording drive lever, said erase head control mechanism being moved by a driving force from said recording drive lever, and (b) prevent said erase head from being moved to said second position where said erase head contacts said tape when said recording lever is out of engagement with said recording drive lever and receives no driving force from said recording drive lever.

2. A tape recorder according to claim 1, wherein said recording drive lever selectively interlocks with said record operating member and said play operating member and is driven by a rotational force of said motor, and wherein said recording lever interlocks with said record operating member.

3. A tape recorder according to claim 2, wherein said erase head control mechanism includes a recording slider for movably supporting said recording lever between said first and second positions, said recording slider being selectively held in a first position where said recording lever receives driving force from said recording drive lever, and in a second position where said recording lever does not receive driving force from said recording drive lever.

4. A tape recorder according to claim 3, further including a normal-speed drive mechanism selectively interlocking with said record operating member and said play operating member.

5. A tape recorder according to claim 4, wherein said normal-speed drive mechanism includes
    an elastic member for biasing said erase head supported by said head slider in a first direction whereby said head slider is moved by said rotational force of said motor upon selective operation of said record operating member and said play operating member when said record operating member moves, said erase head biased by said elastic member is brought into contact with said tape.

6. A tape recorder according to claim 5, wherein said recording slider engages said erase head and leaves said erase head in said first position prior to movement of said head slider against a biasing force of said elastic member when said recording slider is set in said second position and said head slider is moved by said rotational force of said motor, and said recording slider disengages from said erase head and allows said erase head to move together with said head slider by said biasing force of said elastic member so as to bring said erase head into contact with said tape when said recording slider is set in said first position and said head slider is moved by said rotational force of said motor.

7. A tape recorder according to claim 6, wherein said first rotary body selectively interlocks with said record operating member and said play operating member so as to receive said rotational force of said motor, thereby selectively moving said head slider and said recording drive lever upon movement of said cam.

8. A tape recorder according to claim 7, wherein said normal-speed drive mechanism includes:
    a normal-speed drive lever driven upon movement of said cam of said first rotary body; and
    a spring having biasing force for transmitting a driving force of said normal-speed drive lever so as to move said head slider.

9. A tape recorder according to claim 8, wherein said normal-speed drive mechanism includes:
    a second rotary body driven by said rotational force of said motor independent of tape travel, said second rotary body being engaged with said first rotary body so as to transmit said rotational force to said first rotary body;
    a notch formed in part of said first rotary body so as to disengage said first rotary body from said second rotary body; and
    a normal-speed lock lever for preventing rotation of said first rotary body when said notch of said first rotary body opposes said second rotary body, and for allowing rotation of said first rotary body upon selective operation of said record operating member and said play operating member;
    whereby said first rotary body is biased so as to rotate in one direction when said spring biasing force is applied to said first rotary body through said normal-speed drive lever and when said notch of said first rotary body opposes said second rotary body.

* * * * *